(12) United States Patent
Mashiki

(10) Patent No.: US 7,063,070 B2
(45) Date of Patent: Jun. 20, 2006

(54) CONTROL DEVICE OF INTERNAL COMBUSTION ENGINE

(75) Inventor: Zenichiro Mashiki, Nisshin (JP)

(73) Assignee: Toyota Jidosha Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/152,147

(22) Filed: Jun. 15, 2005

(65) Prior Publication Data

US 2006/0016429 A1    Jan. 26, 2006

(30) Foreign Application Priority Data

Jul. 22, 2004    (JP)    .............................. 2004-214396

(51) Int. Cl.
*F02B 7/02*    (2006.01)
*F02B 7/04*    (2006.01)

(52) U.S. Cl. ...................................... 123/431; 123/299

(58) Field of Classification Search ................ 123/431, 123/299, 300, 305, 295, 430, 478
See application file for complete search history.

(56) References Cited

U.S. PATENT DOCUMENTS

| | | | |
|---|---|---|---|
| 5,050,550 A | * | 9/1991 | Gao .......................... 123/275 |
| 6,314,940 B1 | | 11/2001 | Frey et al. |
| 6,659,071 B1 | * | 12/2003 | LaPointe et al. ............. 123/299 |
| 6,810,858 B1 | * | 11/2004 | Ito et al. ...................... 123/478 |

FOREIGN PATENT DOCUMENTS

| | | |
|---|---|---|
| EP | 1 308 617 A1 | 5/2003 |
| EP | 1 361 354 A2 | 11/2003 |
| JP | A 09-068072 | 3/1997 |
| JP | 10299494 | * 11/1998 |
| JP | 10317936 | * 12/1998 |
| JP | A 10-317936 | 12/1998 |
| JP | A 2000-145516 | 5/2000 |
| JP | A 2003-322044 | 11/2003 |

* cited by examiner

*Primary Examiner*—Mahmoud Gimie
(74) *Attorney, Agent, or Firm*—Oliff & Berridge, PLC

(57) ABSTRACT

An engine ECU executes a program including a step of lowering a pressure of fuel supplied to an in-cylinder injector when it is determined that a degree of dilution of an oil with the fuel is large, a step of calculating a fuel injection period TAUd of the in-cylinder injector with a low fuel pressure, a step of calculating a fuel pressure $Pr(0)$ of the in-cylinder injector required according to an engine speed and a load, a step of calculating a fuel injection period $TAUd(0)$ of the in-cylinder injector with $Pr(0)$, and a step of substituting $TAUd(0)$ for TAUd when TAUd is equal to or larger than $TAUd(0)$.

10 Claims, 6 Drawing Sheets

CONTROL DEVICE OF INTERNAL COMBUSTION ENGINE

This nonprovisional application is based on Japanese Patent Application No. 2004-214396 filed with the Japan Patent Office on Jul. 22, 2004, the entire contents of which are hereby incorporated by reference.

BACKGROUND OF THE INVENTION

1. Field of the Invention

The present invention relates to a control device of an internal combustion engine including a first fuel injection mechanism (i.e., in-cylinder injector) for injecting fuel into a cylinder and a second fuel injection mechanism (i.e., intake manifold injector) for injecting fuel into an intake manifold or an intake port, and particularly to a technique suppressing dilution of a lubricating oil of the internal combustion engine with fuel injected from the first fuel injection mechanism.

2. Description of the Background Art

A certain kind of known internal combustion engine includes an intake manifold injector for injecting fuel into an intake manifold of an engine and an in-cylinder injector for always injecting the fuel into a combustion chamber of the engine, and is configured such that the intake manifold injector stops the fuel injection when an engine load is lower than a predetermined set load, and injects the fuel when the engine load is higher than the set load. In this internal combustion engine, a total injection amount, which is a sum of amounts of the fuel injected from both injectors, is predetermined as a function of the engine load, and increases with the engine load.

The in-cylinder injector has a hole directly opening to a combustion chamber of the internal combustion engine, and injects fuel, which is pressurized by a fuel pump, directly into the cylinder. The in-cylinder injector directly injecting the fuel into the cylinder of the internal combustion engine performs the fuel injection in a later stage of a compression strike to control precisely a mixture state of an air-fuel mixture in the cylinder for improving fuel consumption and others. However, the in-cylinder injector may cause the following disadvantage during a cold state of the engine because it directly injects the fuel into the cylinder.

In the cold state of the engine, atomization of the fuel in the cylinder is relatively suppressed, and a large amount of injected fuel is liable to adhere to a top surface of a piston and an inner peripheral surface of the cylinder. During the cold state of the engine, therefore, such setting is employed that the fuel injection is performed in the intake stroke (i.e., the intake stroke injection is performed) to increase a period from the fuel injection to the ignition as long as possible for promoting atomization of the injected fuel. However, even this intake stroke injection cannot completely prevent the foregoing fuel adhesion, and a part of the fuel will remain in the adhering state within the cylinder after the combustion without being burned.

A part of the fuel adhered to the piston top surface is gradually atomized, and will be discharged from the cylinder after incomplete burning in the next combustion stroke. This causes occurrence of black smoke, increase in unburned components and others, and thus impairs the emission characteristics.

A part of the adhering fuel, and particularly the fuel adhering to the inner peripheral surface of the cylinder is mixed with a lubricating oil, which adheres to the inner peripheral surface of the cylinder for lubricating the piston of the engine. Therefore, the fuel dilutes the lubricating oil, and thus a so-called fuel-dilution occurs. The lubricating oil thus diluted with the fuel in the cylinder is scraped off by the vertically moving piston. The lubricating oil thus scraped returns to an oil pan, and will be reused for lubricating the engine. If the fuel frequently dilutes the lubricating oil, a rate of the mixed fuel with respect to the whole lubricating oil gradually increases, and this will cause adverse effects on the lubricating performance of the internal combustion engine such as lowering of the lubricating performance.

Japanese Patent Laying-Open No. 2003-322044 has disclosed a fuel injection control device of an internal combustion engine of an in-cylinder injection type. This control device flexibly controls a manner of fuel injection according to an actual extent of the adverse effect, which is exerted on the internal combustion engine by deterioration of emission characteristics due to adhesion of fuel to a top surface of a piston and an inner peripheral surface of a cylinder.

This fuel injection control device is used in the internal combustion engine of the in-cylinder injection type configured to inject the fuel directly into the cylinder of the internal combustion engine, and includes a dilution degree estimating unit estimating the degree of dilution of a whole lubricating oil, which is used for lubricating the internal combustion engine, with the fuel, and a control unit controlling a fuel injection manner to suppress dilution of the lubricating oil with the fuel when an estimated degree of dilution with the fuel is large.

According to this fuel injection control device of the internal combustion engine of the in-cylinder injection type, when the whole lubricating oil is diluted with the fuel only to a small extent, the fuel injection is temporarily allowed even in such a situation that fuel injection is performed under in a situation that the fuel adhering to the inner peripheral surface of the cylinder increases in amount to increase the extent of fuel-dilution (i.e., dilution with fuel). This can suppress the adhesion of the fuel to the top surface of the piston, and thereby can suppress deterioration of the emission characteristics such as occurrence of black smoke as far as possible. Conversely, when the degree of fuel-dilution of the whole lubricating oil increases to such an extent that further fuel-dilution will cause unignorable adverse effects such as lowering of the lubrication performance, the fuel injection is controlled to suppress the dilution of the lubricating oil with the fuel. Consequently, it is possible to suppress the adverse effects due to the fuel-dilution of the lubricating oil.

However, if the fuel injection manner or form (specifically, a fuel injection time of the in-cylinder injector and a fuel pressure) is changed as disclosed in Japanese Patent Laying-Open No. 2003-322044, it may become impossible to achieve a performance of the internal combustion engine, which is basically required in connection with an engine speed, a load factor and others.

SUMMARY OF THE INVENTION

The invention has been made for overcoming the above problems, and an object of the invention is to provide a control device of an internal combustion engine configured to share fuel injection between a first fuel injection mechanism injecting fuel into a cylinder and a second fuel injection mechanism injecting the fuel into an intake manifold, and particularly to provide a control device, which can suppress dilution of a lubricating oil without lowering a performance of the internal combustion engine even when the fuel injected from the first fuel injection mechanism may dilute the lubricating oil of the internal combustion engine.

A control device according to the invention controls an internal combustion engine including a first fuel injection mechanism for injecting fuel into a cylinder, and a second fuel injection mechanism for injecting the fuel into an intake manifold. The control device includes a control unit controlling the fuel injection mechanisms to share the fuel injection between the first and second fuel injection mechanisms based on required conditions of the internal combustion engine, and a dilution degree estimating unit estimating a degree of dilution of a lubricating oil used for lubricating the internal combustion engine with the fuel. The control unit controls the fuel injection mechanisms to suppress the degree and to achieve a required performance of the internal combustion engine when the estimated degree is large.

According to this invention, the fuel injected from the first fuel injection mechanism (e.g., in-cylinder injector) and adhering to an inner peripheral surface of the cylinder is mixed with the lubricating oil adhering to the inner peripheral surface of the cylinder for lubricating the piston of the internal combustion engine, and thereby dilutes the lubricating oil. When the dilution degree estimating unit estimates that the degree is large, the control unit controls the in-cylinder injector, e.g., (1) to lower the fuel pressure of the in-cylinder injector, (2) to reduce a fuel injection period of the in-cylinder injector or (3) to change the fuel injection time of the in-cylinder injector to perform the injection when the piton is at the vicinity of the top dead center (i.e., when the piston is covering the inner peripheral surface of the cylinder). When the control is performed in this manner, the fuel injection amount of the in-cylinder injector may be smaller by a certain amount than the fuel injection amount calculated from the required performance of the internal combustion engine. In this case, the second fuel injection mechanism (e.g., intake manifold injector) injects the fuel of the amount equal to the above amount of shortage. In this manner, the combustion chamber of the internal combustion engine is supplied with the fuel of the amount satisfying the required performance. Consequently, the control device of the internal combustion engine of the invention can suppress the dilution of the lubricating oil without lowering the performance of the internal combustion engine, which shares the fuel injection between the in-cylinder injector and the intake manifold injector, even when the fuel injected from the in-cylinder injector may dilute the lubricating oil of the internal combustion engine.

Preferably, the control unit controls the first fuel injection mechanism to lower a pressure of the fuel supplied to the first fuel injection mechanism for lowering a spray penetrating force.

According to this invention, the pressure of the fuel supplied to the in-cylinder injector can be lowered to reduce the spray penetrating force. By lowering the pressure of the fuel supplied to the in-cylinder injector, an injection speed of the fuel lowers, and an amount of the fuel reaching the inner peripheral surface of the cylinder decreases. Therefore, the fuel injected from the in-cylinder injector does not reach the inner peripheral surface of the cylinder or only a small amount of fuel reaches the inner peripheral surface. Therefore, adhesion of the fuel to the inner peripheral surface of the cylinder can be avoided, and the dilution of the lubricating oil with the fuel injected from the in-cylinder injector can be suppressed.

Further preferably, the control unit controls the first fuel injection mechanism by changing at least one of a fuel injection time and a fuel injection period to prevent impinging of the fuel injected from the first fuel injection mechanism on an inner peripheral surface of the cylinder.

According to this invention, as the piston of the internal combustion engine is located closer to the top dead center at the time of the fuel injection, a portion of the inner peripheral surface of the cylinder covered with the piston of the internal combustion engine increases in area. Based on the position of the piston of the internal combustion engine and the injection direction of the in-cylinder injector, the control unit changes at least one of the fuel injection time and the fuel injection period such that the in-cylinder injector terminates the fuel injection when the piston is located on the top dead center side and covers the inner peripheral surface of the cylinder. Therefore, the fuel injected from the in-cylinder injector impinges on the piston, and does not reach the inner peripheral surface of the cylinder. Accordingly, it is possible to avoid adhesion of the fuel to the inner peripheral surface of the cylinder, and to suppress dilution of the lubricating oil with the fuel injected from the in-cylinder injector.

Further preferably, the control unit controls the second fuel injection mechanism for compensating for a shortage when the shortage occurs with respect to a required fuel injection amount due to change in fuel injection control of the first fuel injection mechanism.

According to this invention, when the control unit controls the in-cylinder injector to suppress a degree of dilution of the lubricating oil with the fuel injected from in-cylinder injector, the fuel injection amount of the in-cylinder injector may be smaller by a certain amount than the fuel injection amount calculated from the required performance of the internal combustion engine. In this case, the control unit controls the intake manifold injector to inject the fuel of the above amount of shortage. Thereby, the combustion chamber of the internal combustion engine is supplied with the fuel of the amount achieving the required performance, and thus the required performance can be achieved.

Further preferably, the first fuel injection mechanism is an in-cylinder injector, and the second fuel injection mechanism is an intake manifold injector.

This invention relates to the control device of the internal combustion engine including the in-cylinder injector and the intake manifold injector, which serves as the first and second fuel injection mechanisms, respectively, are independent of each other, and share the fuel injection between them. According to the above invention, even when the fuel injected from the in-cylinder injector may dilute the lubricating oil of the internal combustion engine, the control device can suppress the dilution of the lubricating oil without lowering the performance of the internal combustion engine.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the invention will now be described with reference to the drawings. In the following description, the same portions bear the same reference numbers and the same names, and achieve the same functions. Therefore, description thereof is not repeated.

Figure 1:
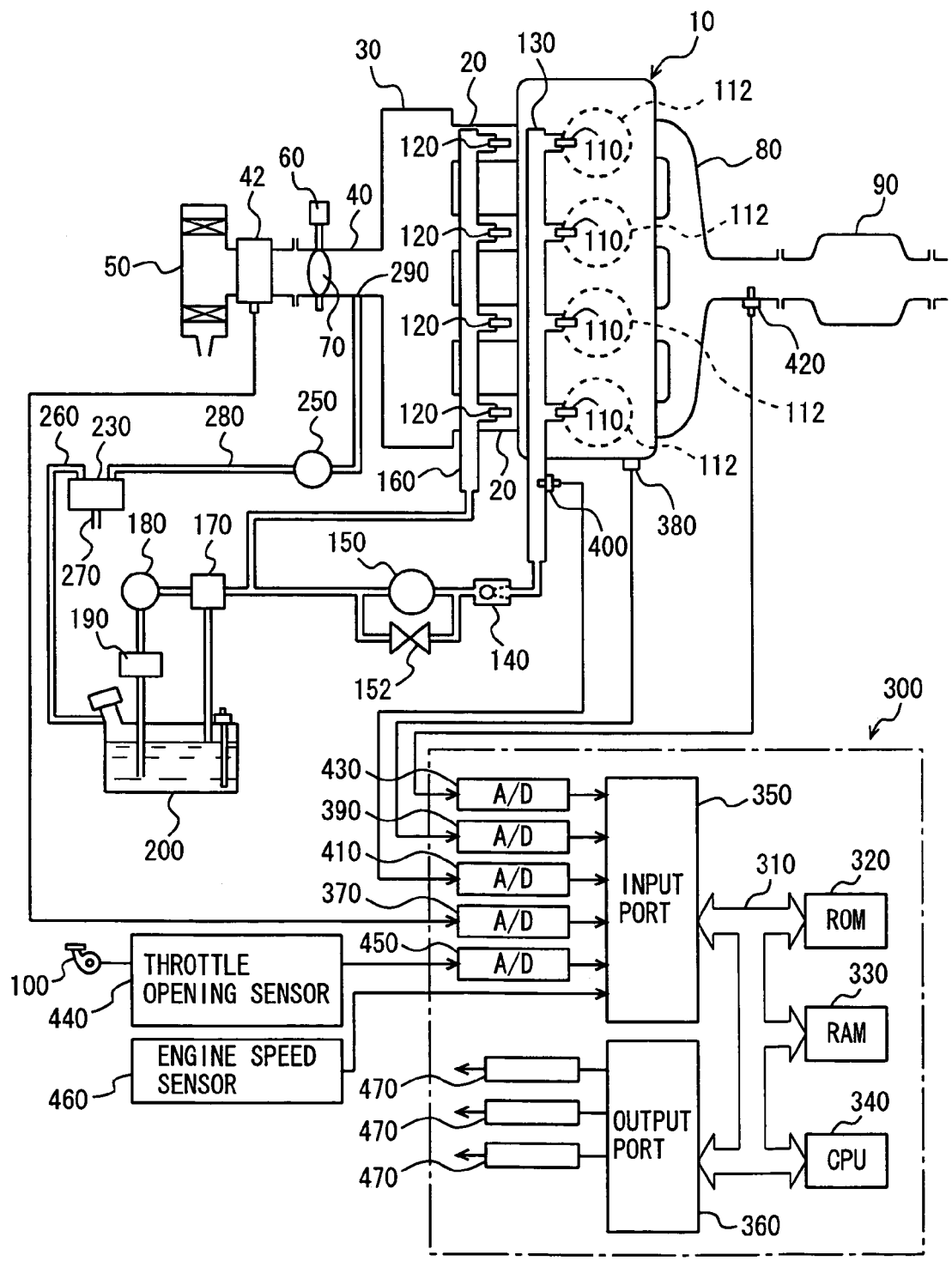
FIG. 1 shows a schematic structure of an engine system controlled by a control device according to an embodiment of the invention.

FIG. 1 shows a schematic structure of an engine system controlled by an engine ECU (Electronic Control Unit), which is a control device of an internal combustion engine according to an embodiment of the invention. Although FIG. 1 shows an inline four-cylinder gasoline engine, the invention is not restricted to such an engine.

As shown in FIG. 1, an engine 10 includes four cylinders 112, which are each connected to a common surge tank 30 via a corresponding intake manifold 20. Surge tank 30 is connected to an air cleaner 50 via an intake duct 40. An air flow meter 42 as well as a throttle valve 70 driven by an electric motor 60 are arranged in intake duct 40. The degree of opening of throttle valve 70 is controlled according to an output signal of an engine ECU 300 independently of an accelerator 100. Each cylinder 112 is coupled to a common exhaust manifold 80, which is coupled to a three-way catalytic converter 90.

For each cylinder 112, the engine is provided with an in-cylinder injector 110 for injecting fuel into the cylinder and an intake manifold injector 120 for injecting the fuel into an intake port or an intake manifold. These injectors 110 and 120 are controlled according to output signals of engine ECU 300. Each in-cylinder injector 110 is connected to a common fuel delivery pipe 130, which is connected to a mechanically driven high-pressure fuel pump 150 via a check valve 140 allowing flow toward fuel delivery pipe 130. Although this embodiment relates to the internal combustion engine, in which two kinds of injectors are arranged independently of each other, the invention is not restricted to the internal combustion engine of such structure. For example, the internal combustion engine may have an injector in the form of a combination of the in-cylinder injector and the intake manifold injector.

As shown in FIG. 1, a discharge side of high-pressure fuel pump 150 is coupled to an intake side of high-pressure fuel pump 150 via an electromagnetic spill valve 152. The amount of the fuel supplied from high-pressure fuel pump 150 to fuel delivery pipe 130 increases with decrease in degree of opening of electromagnetic spill valve 152. When electromagnetic spill valve 152 fully opens, high-pressure fuel pump 150 stops supply of the fuel to fuel delivery pipe 130. Electromagnetic spill valve 152 is controlled according to an output signal of engine ECU 300.

More specifically, electromagnetic spill valve 152 is arranged on the intake side of high-pressure fuel pump 150, which pressurizes the fuel by reciprocating a pump plunger by a cam attached to a cam shaft. Engine ECU 300 performs the feedback control of the closing timing of electromagnetic spill valve 152 in the pressurizing stroke by using a fuel pressure sensor 400 arranged at fuel delivery pipe 130. Thus, engine ECU 300 controls electromagnetic spill valve 152 to control the amount and pressure of the fuel supplied from high-pressure fuel pump 150 to fuel delivery pipe 130.

Each intake manifold injector 120 is connected to a common fuel delivery pipe 160 on a low pressure side. Fuel delivery pipe 160 and high-pressure fuel pump 150 are connected to a low-pressure fuel pump 180 driven by an electric motor via a common fuel pressure regulator 170. Low-pressure fuel pump 180 is connected to a fuel tank 200 via a fuel filter 190. Fuel pressure regulator 170 is configured to return a part of fuel discharged from low-pressure fuel pump 180 to fuel tank 200 when the pressure of the fuel discharged from low-pressure fuel pump 180 exceeds a preset fuel pressure. Thus, fuel pressure regulator 170 prevents such a situation that the fuel pressure applied to intake manifold injector 120 and the fuel pressure applied to high-pressure fuel pump 150 exceed the above preset fuel pressure.

Engine ECU 300 is formed of a digital computer, and includes a ROM (Read Only Memory) 320, a RAM (Random Access Memory) 330, a CPU (Central Processing Unit) 340, an input port 350 and an output portion 360, which are mutually connected via a bidirectional bus 310.

Air flow meter 42 produces an output voltage, which is proportional to an intake air flow rate, and provides it to input port 350 via an A/D converter 370. Engine 10 is provided with a coolant temperature sensor 380 producing an output voltage that is proportional to a temperature of engine coolant, and provides it to input port 350 via an A/D converter 390.

A fuel pressure sensor 400, which produces an output voltage proportional to the fuel pressure in fuel delivery pipe 130, is attached to fuel delivery pipe 130, and provides the output voltage to input port 350 via an A/D converter 410. An air-fuel ratio sensor 420, which produces an output voltage proportional to an oxygen concentration of the exhaust gas, is attached to exhaust manifold 80 upstream of three-way catalytic converter 90, and provides the output voltage to input port 350 via an A/D converter 430.

Air-fuel ratio sensor 420 in the engine system according to the embodiment is a whole area air-fuel ratio sensor (linear air-fuel ratio sensor) producing the output voltage proportional to the air-fuel ratio of the mixture burned in engine 10. Air-fuel ratio sensor 420 may be formed of an $O_2$ sensor determining, in an on-off fashion, whether the air-fuel ratio of the mixture burned in engine 10 is rich or lean with respect to a theoretical air-fuel ratio.

Accelerator 100 is connected to an accelerator press-down degree sensor 440, which produces an output voltage proportional to an amount of press-down of accelerator 100, and provides the output voltage to input port 350 via an A/D converter 450. Input port 350 is also connected to an engine speed sensor 460, which produces an output pulse indicating an engine speed. ROM 320 of engine ECU 300 has stored, in a mapped form, the value of fuel injection amount, which is set corresponding to the operation state based on the engine load factor and the engine speed obtained by accelerator press-down degree sensor 440 and engine speed sensor 460, respectively, as well as the correction value depending on the engine coolant temperature.

The lubrication system of engine 10 is formed of an oil pan, which is a part of a crank case, and a lubricating oil supply device. The lubricating oil supply device includes an oil pump, a filter, an oil jet mechanism and others. The oil pump takes in the lubricating oil from the oil pan, and supplies it to the oil jet mechanism. For lubrication between the piston and the inner peripheral surface of the cylinder, the oil jet mechanism supplies the lubricating oil onto the inner peripheral surface of the cylinder. In accordance with reciprocation of the piston, the lubricating oil thus supplied is scrapped off, and finally returns into the lower oil pan. The lubricating oil thus scrapped is mixed with the lubricating oil in the oil pan, and then is used for the lubrication of engine 10 again. The lubricating oil, which is supplied onto the inner peripheral surface of the cylinder to lubricate the piston, is heated by combustion heat of engine 10, and then returns to the oil pan.

Figure 2:
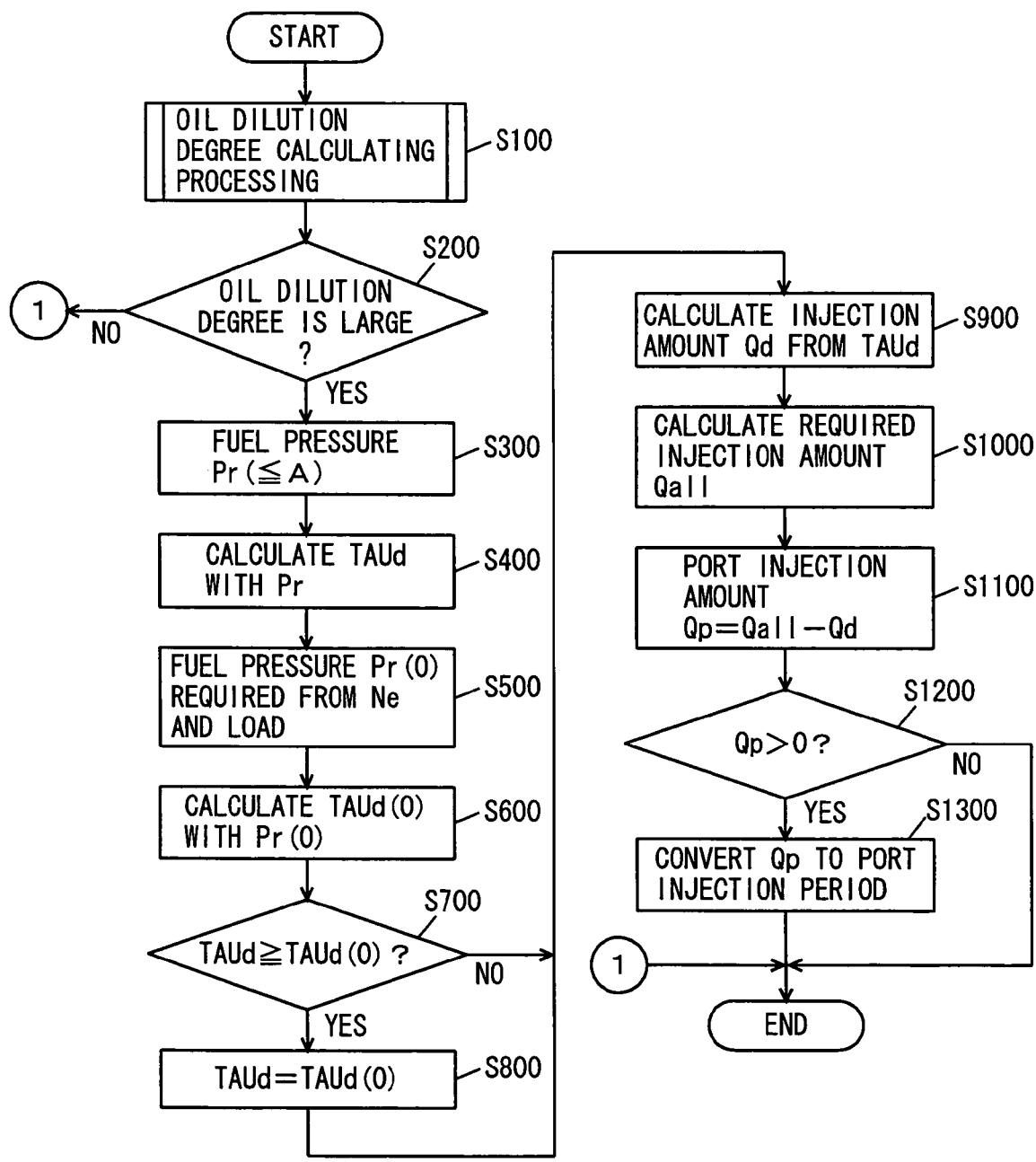
FIGS. 2 and 3 are flowcharts illustrating a control structure of a program executed by an engine ECU, which is the control device according to the embodiment of the invention.

Referring to FIG. 2, description will now be given on a control structure of a program executed by engine ECU 300, which is the control device of the internal combustion engine according to the embodiment. The program of the flowchart of FIG. 2 is executed at predetermined time intervals T.

In a step S100, engine ECU 300 executes processing of calculating an oil dilution degree. The processing in step S100 is performed in a subroutine, which will be described later in detail with reference to FIG. 3.

In a step S200, engine ECU 300 determines whether the oil dilution degree is large or not. This determination is performed based on whether a fuel-dilution occurrence flag XS, which will be described later, is on or not. When fuel-dilution occurrence flag XS is on and indicates that the oil dilution degree is large (YES in S200), the process proceeds to a step S300. If not (NO in S200), the processing ends.

In step S300, engine ECU 300 sets a pressure of the fuel supplied to in-cylinder injector 110 to a value Pr equal to or lower than a predetermined low set value A. In a step S400, engine ECU 300 calculates a fuel injection period TAUd of in-cylinder injector 110 with fuel pressure Pr.

In a step S500, engine ECU 300 calculates a required fuel pressure Pr(0) of the fuel to be supplied to in-cylinder injector 110 according to the engine speed and load (load factor) of engine 10. In a step S600, engine ECU 300 calculates a fuel injection period TAUd(0) of in-cylinder injector 110 according to required fuel pressure Pr(0).

In a step S700, engine ECU 300 makes a comparison between fuel injection periods TAUd and TAUd(0) of in-cylinder injector 110. When TAUd is equal to or larger than TAUd(0) (YES in S700), the process proceeds to a step S800. Otherwise (NO in S700), the process proceeds to a step S900.

In a step S800, engine ECU 300 substitutes TAUd(0) for TAUd, and performs next processing in a step S900. Thereby, TAUd(0) guards fuel injection period TAUd of in-cylinder injector 110.

In step S900, engine ECU 300 calculates an injection amount Qd from fuel injection period TAUd of in-cylinder injector 110. In a step S1000, engine ECU 300 calculates a required injection amount Qall based on the required performance (i.e., engine speed and load factor) of engine 10.

In a step S1100, engine ECU 300 calculates a port injection amount Qp, which is an injection amount of intake manifold injector 120, as (Qp=Qall−Qd).

In a step S1200, engine ECU 300 determines whether port injection amount Qp of intake manifold injector 120 is positive or not. When port injection amount Qp is positive (YES in S1200), the process proceeds to a step S1300. Otherwise (NO in S1200), this process ends. In the processing in step S1200, it is determines whether port injection amount Qp is positive or not. Alternatively, it may be determined whether port injection amount Qp is larger than the minimum value of the port injection amount or not.

In a step S1300, engine ECU 300 makes a conversion to obtain a port injection period TAUp from port injection amount Qp.

Figure 3:
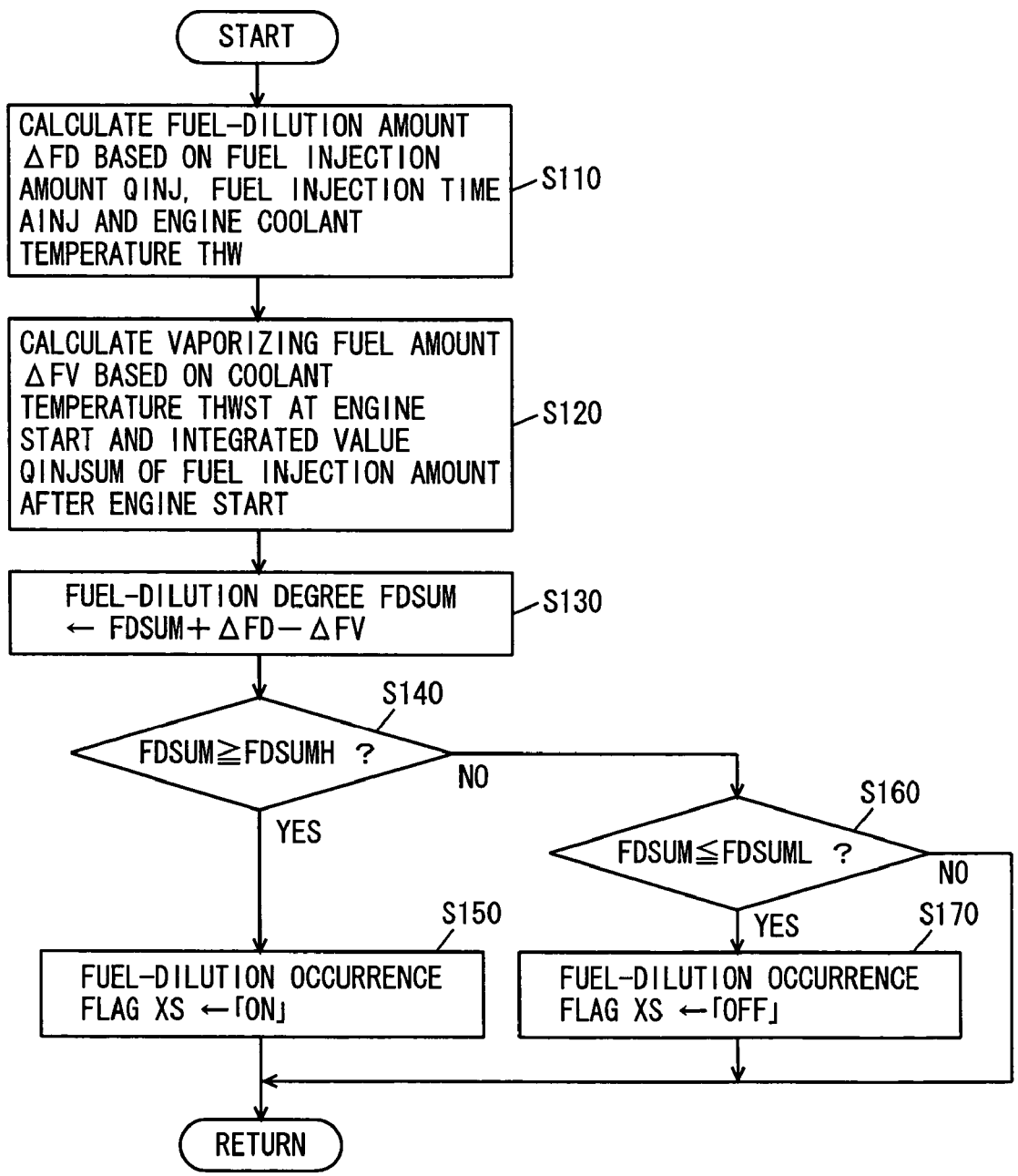

Referring to FIG. 3, description will now be given on a control structure of the subroutine program of the processing of calculating the oil dilution degree in step S100 illustrated in FIG. 2.

According to this embodiment, the fuel-dilution degree, i.e., the degree of diluting oil with fuel is processed in connection with the whole lubricating oil in such a manner that an increasing rate and a decreasing rate of the fuel-dilution degree are cyclically calculated, and the fuel-dilution degree, which is currently estimated, is renewed according to the increasing and decreasing rates thus calculated, and the renewed value is learned as a new value of the fuel-dilution degree.

Engine ECU 300 executes the program illustrated in the flowchart of FIG. 2 at predetermined time intervals T. Therefore, the subroutine program in the flowchart of FIG. 3 is repeated at the predetermined time intervals T.

In step S110, engine ECU 300 calculates a fuel-dilution amount $\Delta FD$ per unit time based on the formula (1), and thus calculates an amount of the fuel, which is added and mixed into the lubricating oil due to the fuel injection performed during time interval T. Fuel-dilution amount $\Delta FD$ corresponds to an increasing rate of the fuel-dilution degree when the fuel vaporization from the whole lubricating oil is not taken into consideration.

$$\Delta FD \leq \Sigma f(QINJi, AINJi, THWi) \qquad (1)$$

where $i=1, 2, 3, \ldots n$

Also, f( ) is a function for obtaining a fuel-dilution amount caused by one fuel injection operation, and uses a fuel injection amount QINJ, a fuel injection time AINJ and engine coolant temperature THW as parameters. Further, "i" represents the number of fuel injection operations performed after the last control period. For example, when the fuel injection has been performed for three times between the last control period and the current control period, the formula (1) can be expressed as the following formula (2):

$$\Delta FD \leq f(QINJ1, AINJ2, THW1) + f(QINJ2, AINJ2, THW2) + f(QINJ3, AINJ2, THW3) \qquad (2)$$

The function f( ) is already determined, e.g., by experiments, and is prestored as a function map in ROM 320 of engine ECU 300. Basically, the value of this function f( ) increases (1) with increase in fuel injection amount QINJ, (2) with retarding of fuel injection time AINJ and (3) with lowering of engine coolant temperature THW.

As the parameters of function f( ), fuel injection amount QINJ, fuel injection time AINJ and engine coolant temperature THW are selected for the following reason. The fuel-dilution, i.e., the dilution with the injected fuel occurs when the fuel adhering to the inner peripheral surface of the cylinder remains without burning. Therefore, it can be considered that the degree of fuel-dilution of the whole lubricating oil significantly increases with increase in amount of the fuel adhering to the inner peripheral surface of the cylinder. It is usually difficult to determine directly the amount of fuel adhering to the inner peripheral surface of the cylinder. However, this amount of fuel adhering to the inner peripheral surface can be appropriately estimated by appropriately selecting the parameters having correlation with the amount of fuel adhering to the inner peripheral surface of the cylinder.

Fuel injection amount QINJ, fuel injection time AINJ and engine coolant temperature THW are typical examples of the parameters having the correlation with the amount of fuel adhering to the inner peripheral surface of the cylinder. For example, as fuel injection amount QINJ increases, the amount of fuel adhering to the inner peripheral surface of the cylinder naturally increases. In connection with the fuel adhering to the inner peripheral surface of the cylinder, there is an upper limit to the amount of adherable fuel per unit area, i.e., to a thickness of a fuel layer formed on the inner peripheral surface of the cylinder. Therefore, as the area of fuel adhesion increases, such a situation is relatively suppressed that the thickness of fuel layer reaches the upper limit, and more fuel can adhere to the inner peripheral surface of the cylinder. Fuel injection time AINJ determines the fuel adhesion area, i.e., the area of the inner peripheral surface of the cylinder, which is exposed to the combustion chamber without being covered with the piston at the time of fuel injection. Assuming that the injection is performed in the intake stroke, the fuel adhesion area increase with retarding of fuel injection time AINJ. Therefore, the amount of fuel adhering to the inner peripheral surface of the cylinder increases with the retarding of the fuel injection time AINJ.

Basically, the fuel adhesion to the inner peripheral surface and others of the cylinder becomes remarkable when the injected fuel is not atomized to a higher extent, and has large particle diameters. The degree of such atomization significantly depends on the temperatures of the combustion chamber and fuel when the fuel injection pressure is constant. Further, the temperatures of the combustion chamber and fuel have correlation with the engine coolant temperature THW. Therefore, as engine coolant temperature THW lowers, the fuel atomization is less promoted so that the amount of fuel adhering to the inner peripheral surface of the cylinder increases.

In view of the foregoing, this embodiment employs fuel injection amount QINJ, fuel injection time AINJ and engine coolant temperature THW as parameters having the correlation with the amount of the fuel adhering to the inner peripheral surface of the cylinder.

In a step S120, engine ECU 300 calculates, based on the formula (3), a vaporizing fuel amount $\Delta FV$ per unit time, i.e., the amount of fuel vaporizing from the whole lubricating oil during time period T. Vaporizing fuel amount $\Delta FV$ corresponds to the lowering rate of the degree of fuel-dilution when the dilution with the injected fuel is not taken into consideration.

$$\Delta FV \leq g(THWST, QINJSUM) \qquad (3)$$

where g( ) is a function for obtaining vaporizing fuel amount $\Delta FV$ per time period T, and uses parameters formed of a coolant temperature THWST at the time of engine start and an integrated value QINJSUM of the fuel injection amount after the engine start. Coolant temperature THWST at the time of engine start is used for estimating an initial temperature of the lubricating oil at the time of engine start. Integrated value QINJSUM of the fuel injection amount after the engine start is used for estimating the amount of temperature rising of the lubricating oil after the start of engine. Basically, function g( ) is used for estimating the lubricating oil temperature, and making a conversion from the result of this estimation to the vaporizing fuel amount. This function g( ) is already determined, e.g., by experiments, and is stored as a function map in ROM 320 of engine ECU 300. Basically, the value of this function g( ) increases (1) with increase in coolant temperature THWST at the time of engine start, and (2) with increase in integrated value QINJSUM of the fuel injection amount after the engine start. In this manner, fuel-dilution amount $\Delta FD$ and vaporizing fuel amount $\Delta FV$ are calculated.

In a step S130, engine ECU 300 calculates fuel-dilution degree FDSUM from the following formula (4).

$$FDSUM \leq FDSUM + \Delta FD - \Delta FV \qquad (4)$$

As represented by the formula (4), a current fuel-dilution degree FDSUM is renewed based on increasing rate $\Delta FD$ and lowering rate $\Delta FV$ of fuel-dilution degree FDSUM. The renewed value is learned as new fuel-dilution degree FDSUM, and is stored in ROM 320 of engine ECU 300.

In a step S140, engine ECU 300 makes a comparison between fuel-dilution degree FDSUM and determined value FDSUMH. When fuel-dilution degree FDSUM is equal to or larger than determined value FDSUMH (YES in S140), the fuel-dilution degree of the whole lubricating oil is large, and it is determined that further dilution with the fuel causes adverse effects such as lowering of the lubrication performance to an unignorable extent. Thereby, the process proceeds to a step S150. Otherwise (NO in S140), the process proceeds to a step S160.

In a step S150, engine ECU 300 sets fuel-dilution occurrence flag XS to "ON".

In a step S160, engine ECU 300 makes a comparison between fuel-dilution degree FDSUM and a determined value FDSUML (<FDSUMH). When fuel-dilution degree FDSUM is equal to or smaller than determined value FDSUML (YES in S160), the fuel-dilution degree of the whole lubricating oil is small. Therefore, even when the fuel injection temporarily causes the fuel-dilution to increase the fuel-dilution degree of the whole lubricating oil, it is determined that this increase in fuel-dilution degree exerts an adverse effect on engine 10 only to an substantially ignorable extent. Therefore, the process proceeds to a step S170. Otherwise (NO in S160), the process ends.

In step S170, engine ECU 300 sets fuel-dilution occurrence flag XS to "OFF".

A difference in magnitude is set between determined values FDSUML and FDSUMH (FDSUML<FDSUMH), and thereby the execution conditions of the on/off operation of fuel-dilution occurrence flag XS have so-called hysteresis. This setting can avoid instable control of the fuel injection, which may occur when the above setting is not employed, and more specifically, may occur, e.g., when fuel-dilution occurrence flag XS is excessively turned on/off to change frequently the fuel pressure within a short time while the operation state of engine 10 is unchanged.

Based on the structures and flowcharts described above, the engine system operates as follows under the control of engine ECU 300, which is the control device of the internal combustion engine according to the embodiment. In the following description, it is assumed that fuel-dilution occurrence flag XS illustrated in FIG. 3 is on.

Engine ECU 300 determines that the oil is diluted with the fuel injected from in-cylinder injector 110 to a large extent (YES in S200), and sets the pressure of the fuel supplied to in-cylinder injector 110 to a low fuel pressure Pr equal to or lower than predetermined low set value A (S300). Based on set fuel pressure Pr, fuel injection period TAUd of in-cylinder injector 110 is calculated.

Fuel pressure Pr(0) of in-cylinder injector 110 required in engine 10 is calculated from the speed and load (load factor) of engine 10. Fuel injection period TAUd(0) of in-cylinder injector 10 corresponding to required fuel pressure Pr(0) is calculated (S600). When fuel injection period TAUd of in-cylinder injector 110 is equal to or larger than TAUd(0), fuel injection period TAUd of in-cylinder injector 110 is guarded and set to TAUd(0) (S800).

Fuel injection amount Qd of in-cylinder injector 110 is calculated from fuel injection period TAUd of in-cylinder injector 10 (S900), and required injection amount Qall of fuel injected from both of in-cylinder injector 110 and intake manifold injector 120 (S1000). Port injection amount Qp of intake manifold injector 120 is calculated by subtracting injection amount Qd of in-cylinder injector 110 from required injection amount Qall (S1100). When port injection amount Qp is positive (YES in S1200), it is determined that in-cylinder injector 110 cannot inject the fuel of the amount enough to achieve the satisfactory performance of engine 10 without using the intake manifold injector 120 due to lowering of the fuel pressure supplied to in-cylinder injector 110. Port injection amount Qp is converted to port injection period TAUp (S1300), and in-cylinder injector 110 and intake manifold injector 120 inject the fuel of amounts Qd and Qp based on the signal provided from engine ECU 300, respectively.

The engine ECU according to the embodiment controls the engine as described above. Thereby, when the fuel injected from the in-cylinder injector adheres to the inner peripheral surface of the cylinder, the fuel may be mixed with the lubricating oil, which is applied onto the inner peripheral surface for lubricating the piston, to cause dilution of the lubricating oil with the mixed oil. In this case, the fuel pressure of the in-cylinder injector lowers. When the pressure of the fuel supplied to the in-cylinder injector lowers, this lowers the spray penetrating force and the fuel injection speed, and thus reduces an amount of the fuel reaching the inner peripheral surface of the cylinder. Thus, the fuel injected from the in-cylinder injector does not reach the inner peripheral surface, or only a small amount of the fuel reaches the inner peripheral surface so that the adhesion of the fuel to the inner peripheral surface of the cylinder can be avoided, and it is possible to suppress the dilution of the lubricating oil with the fuel injected from the in-cylinder injector. When the fuel injection amount of the in-cylinder injector is smaller by a certain amount than the fuel injection amount corresponding to the required performance of the engine, the intake manifold injector is used to inject the fuel of the above amount of shortage. Thereby, the engine can exhibit the required performance.

Other Embodiments

A modification of the embodiment of the invention will now be described. In the embodiment already described, the pressure of the fuel supplied to in-cylinder injector 110 is changed and lowered. However, in the following modification, at least one of the fuel injection period and the fuel injection time of the in-cylinder injector is changed to avoid the adhesion of the fuel injected from in-cylinder injector 110 to the inner peripheral surface of the cylinder. The hardware structure according to this modification is the same as that already described and shown in FIG. 1, and therefore detailed description thereof is not repeated. In this modification, when it is determined that the degree of the oil dilution is large, engine ECU 300 changes at least one of the fuel injection time and fuel injection period of in-cylinder injector 110 so that the fuel injected from in-cylinder injector 110 may not impinge on the inner peripheral surface of the cylinder.

Figure 4:
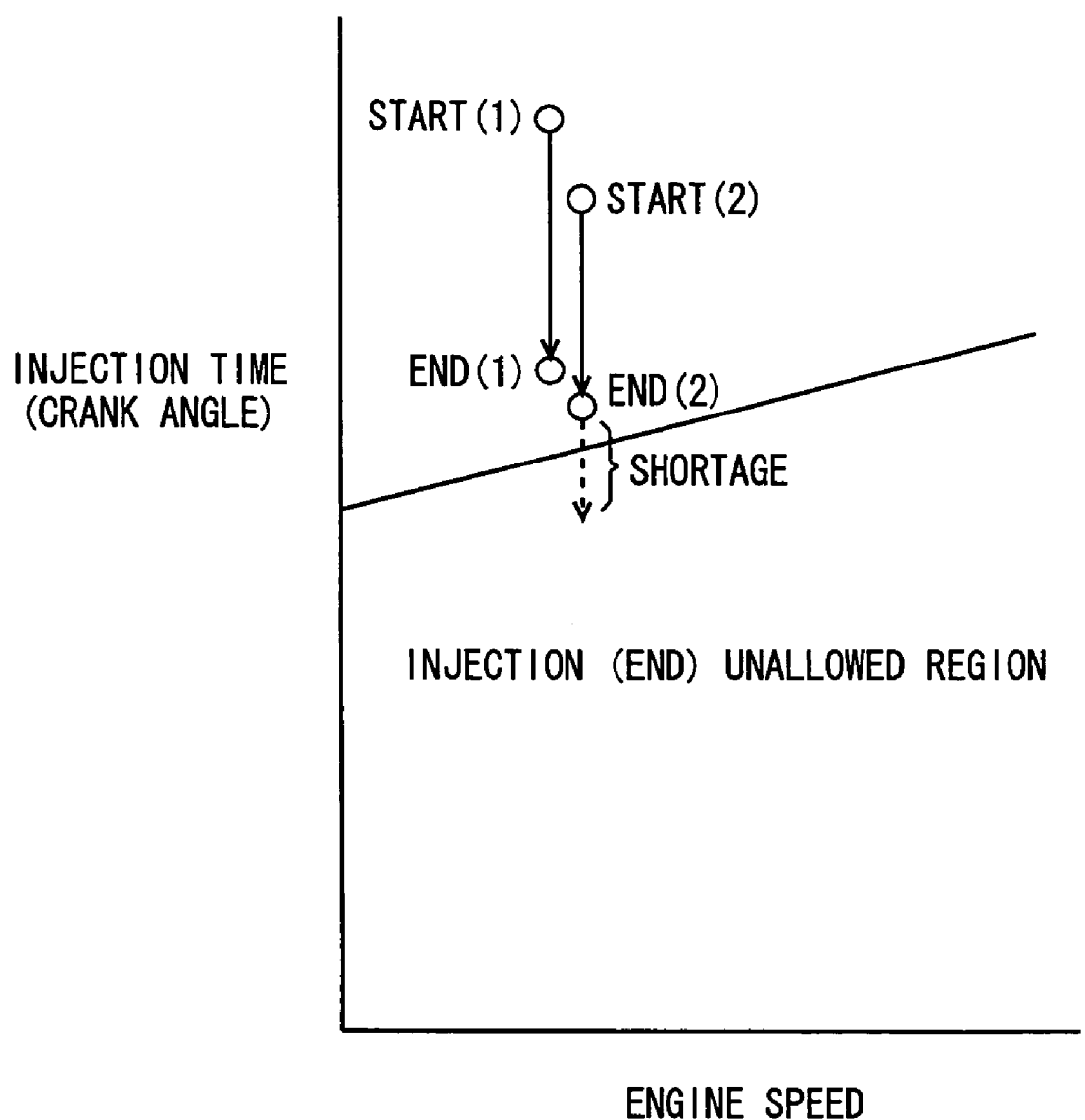
FIG. 4 illustrates injection timing stored in an engine ECU, which is a control device according to a modification of the embodiment of the invention.
Figure 5:
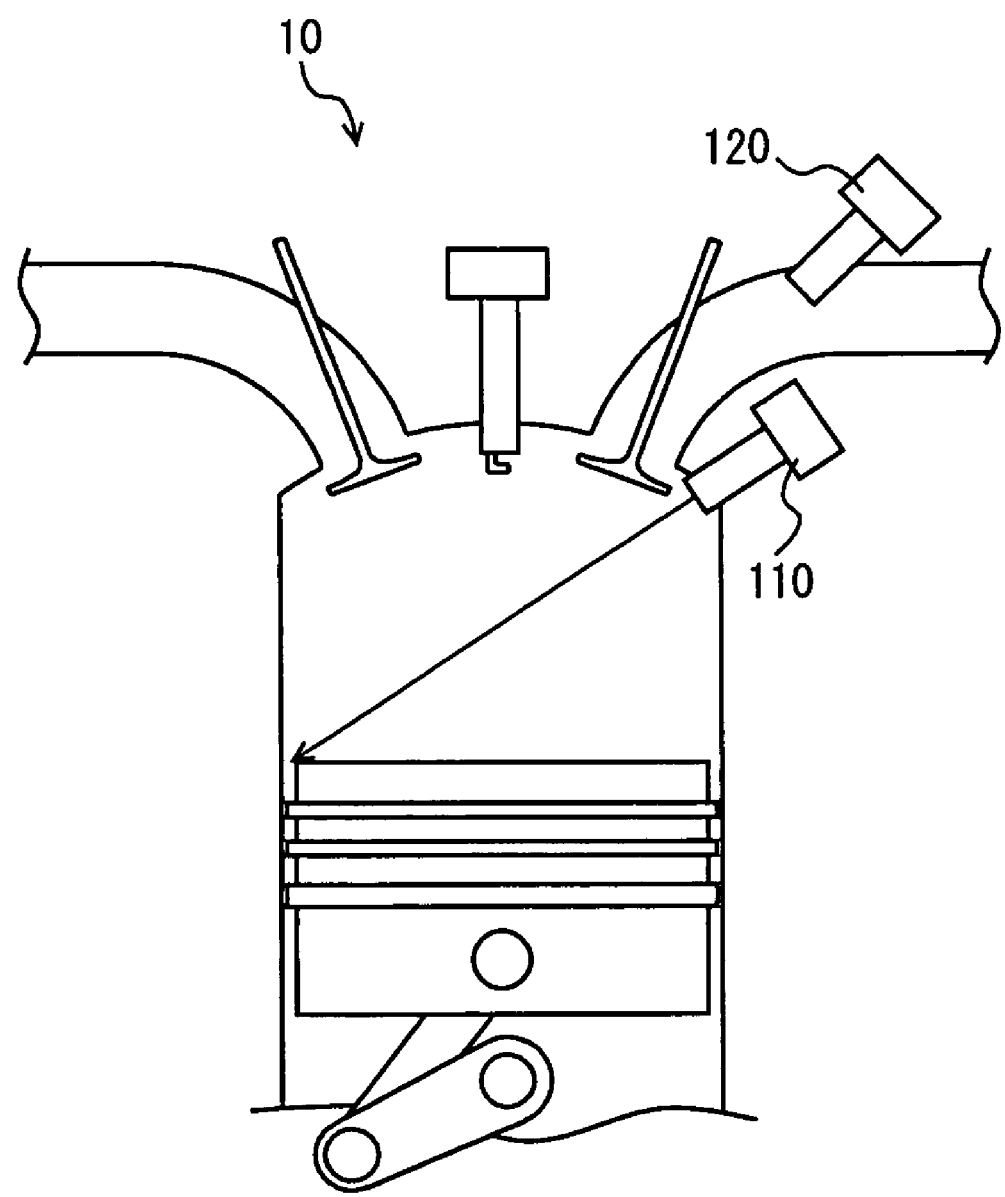
FIG. 5 illustrates a state of fuel injection of an in-cylinder injector controlled by the engine ECU, which is the control device according to the modification of the invention.

Referring to FIGS. 4 and 5, the modification will now be described. FIG. 4 illustrates the injection timing of in-cylinder injector 110 stored in ROM 320 of engine ECU 300. In FIG. 4, the abscissa gives the engine speed, and the ordinate gives the crank angle representing the injection time. As illustrated in FIG. 4, at least one of the injection time and the injection period of the in-cylinder injector is controlled to avoid such a situation that an injection end time (END) of the in-cylinder injector enters an injection (end) unallowed region. In the case indicated by START(1) and END(1) in FIG. 4, the injection time of in-cylinder injector 110 is advanced to avoid entry of the injection end time in the injection (end) unallowed region. In the case indicated by START(2) and END(2) in FIG. 4, the injection start time is not advanced, and the fuel injection period is shorted. In this case, the fuel injection amount of in-cylinder injector 110 alone is not enough to achieve fully the performance required in engine 10, and therefore intake manifold injector 120 is used for compensating for the shortage.

By controlling the injection time of in-cylinder injector 110 as illustrated in FIG. 4, the fuel injected from in-cylinder injector 110 is cut off by the piston, and does not reach the inner peripheral surface of the cylinder. Thus, as the position of the piston of engine 10 becomes closer to the top dead center when in-cylinder injector 110 injects the fuel, a wider portion or area of the inner peripheral surface of the cylinder is covered by the piston of engine 10. As illustrated in FIG. 5, engine ECU 300 changes at least one of the fuel injection time and the fuel injection period, in view of the position of the piston of engine 10 and the injection direction of in-cylinder injector 110, such that the fuel injection of in-cylinder injector 110 may terminate when the piston is in the position on the top dead center side covering the inner peripheral surface of the cylinder.

According to the engine system controlled by the engine ECU of the modification, as described above, the fuel injected from the in-cylinder injector impinges on the piston, and thus does not reach the inner peripheral surface of the cylinder so that adhesion of the fuel to the inner peripheral surface of the cylinder can be avoided, and it is possible to suppress the dilution of the lubricating oil with the fuel injected from the in-cylinder injector.

Engine Suitable for Employing Control Device of the Embodiment

Figure 6:
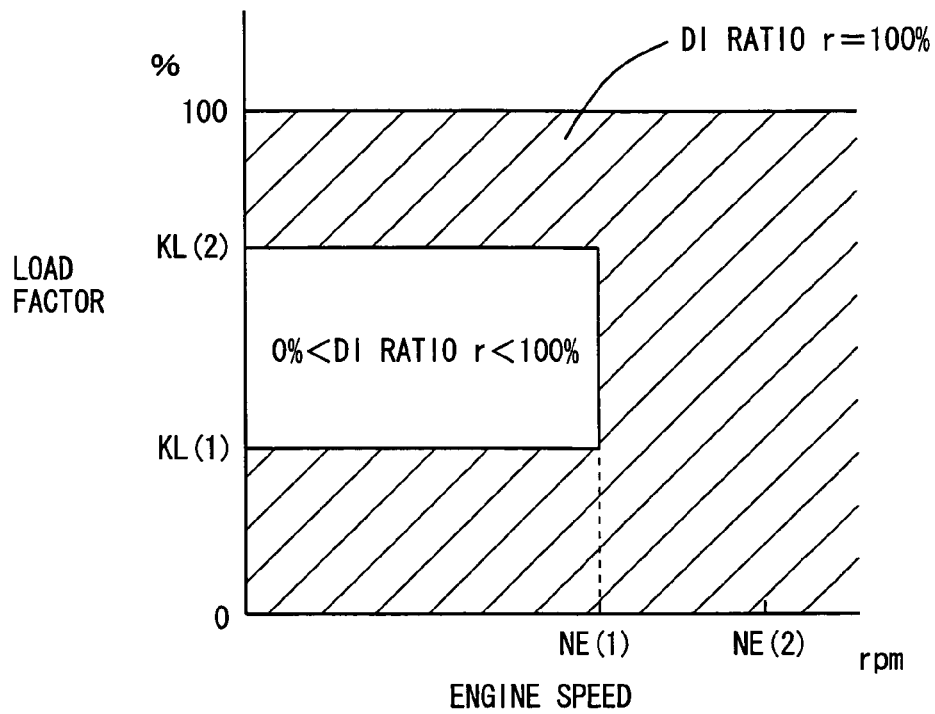
FIG. 6 illustrates a DI ratio map of a warm state of an engine, which can suitably employ the control device according to the embodiment of the invention.
Figure 7:
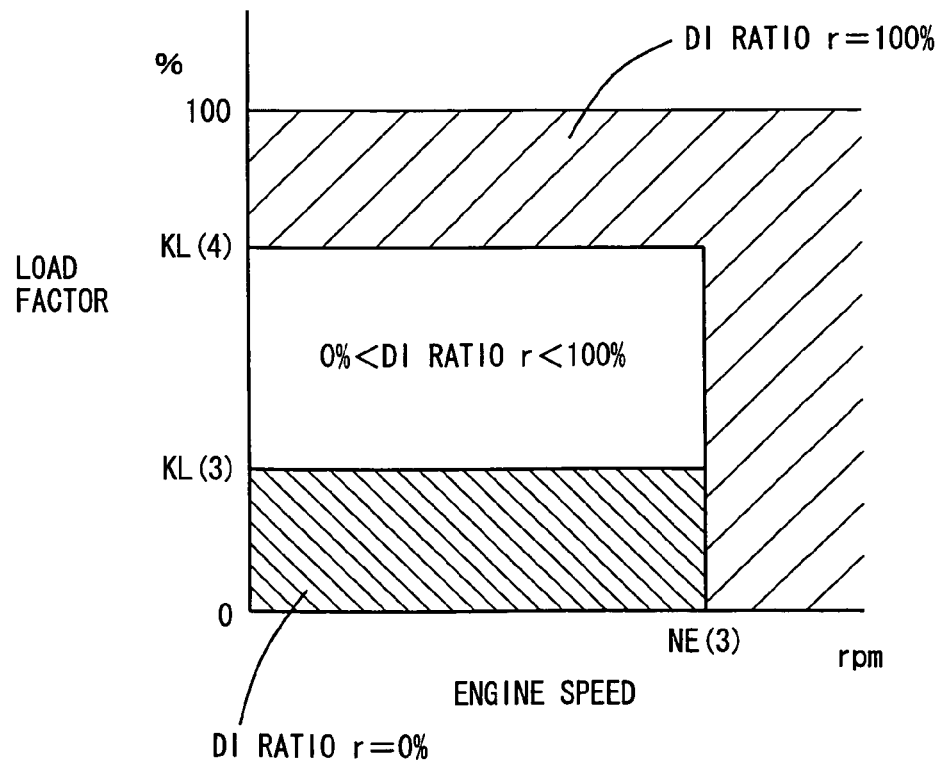
FIG. 7 illustrates a DI ratio map of a cold state of an engine, which can suitably employ the control device according to the embodiment of the invention.

Referring to FIGS. 6 and 7, description will now be given on information corresponding to the operation state of engine 10, and particularly on the map representing the injection sharing ratio (i.e., DI ratio r) between in-cylinder injector 110 and intake manifold injector 120. This map is stored in ROM 320 of engine ECU 300. FIG. 6 is a map for a warm state of engine 10, and FIG. 7 is a map for a cold state of engine 10.

In the maps illustrated in FIGS. 6 and 7, the abscissa gives an engine speed of engine 10, the ordinate gives a load factor, and the DI ratio r, i.e., the sharing ratio of in-cylinder injector 110 is represented as a percentage.

As illustrated in FIGS. 6 and 7, DI ratio r is set for each operation region determined by the engine speed and the load factor of engine 10. "DI RATIO r=100%" represents a region in which only in-cylinder injector 110 performs the fuel injection. "DI RATIO r=0%" represents a region in which only intake manifold injector 120 performs the fuel injection. "DI RATIO r≠0%", "DI RATIO r≠100%" and "0%<DI RATIO r<100%" represent regions in which in-cylinder injector 110 and intake manifold injector 120 share the fuel injection. Schematically, in-cylinder injector 110 contributes to the rising of output performance, and intake manifold injector 120 contributes to the uniformity in air-fuel mixture. These two kinds of injectors having different characteristics are appropriately selected depending on the engine speed and load factor so that only homogenous combustion can be performed in the normal operation state of engine 10, i.e., in the state other than the abnormal operation state such as a catalyst warm-up state during idling.

As illustrated in FIGS. 6 and 7, sharing ratio (DI ratio) r between in-cylinder injector 110 and intake manifold injector 120 is defined in each of the maps representing the warm state and the cold state, respectively. The maps are configured such that a different control region is used for in-cylinder injector 110 and intake manifold injector 120 when the temperature of engine 10 changes. The temperature of engine 10 is detected, and the map of the warm state in. FIG. 6 is selected when the temperature of engine 10 is equal to or higher than a predetermined temperature threshold. Otherwise, the map of the cold state in FIG. 7 is selected. Based on the maps thus selected, in-cylinder injector 110 and/or intake manifold injector 120 are controlled according to the engine speed and the load factor of engine 10.

Description will now be given on the engine speed and the load factor of engine 10 represented in FIGS. 6 and 7. In FIG. 6, NE(1) is set to 2500–2700 rpm, KL(1) is set to 30–50%, and KL(2) is set to 60–90%. In FIG. 7, NE(3) is set to 2900–3100 rpm. Thus, NE(1) is smaller than NE(3). NE(2) in FIG. 6 as well as KL(3) and KL(4) in FIG. 7 are appropriately determined.

From a comparison between FIGS. 6 and 7, it can be seen that NE(3) in the cold state map of FIG. 7 is higher than NE(1) in the warm state map of FIG. 6. This means that the lower temperature of engine 10 expands the control region of intake manifold injector 120 to a higher engine speed. That is, cold engine 10 can suppress production of deposits in the injection hole of in-cylinder injector 110 (even when in-cylinder injector 110 does not inject the fuel). Therefore, it is possible to achieve the setting that expands the region of performing the fuel injection by intake manifold injector 120, and the homogeneity can be improved.

From the comparison between FIGS. 6 and 7, when the engine speed of engine 10 is in a region equal to or higher than NE(1) on the warm state map, or is in a region equal to or higher than NE(3) on the cold state map, the relationship of "DI RATIO r=100%" is attained. When the load factor is in a region equal to or higher than KL(2) on the warm state map, or is in a region equal to or higher than KL(4) on the cold state map, the relationship of "DI RATIO r=100%" is attained. These mean that only in-cylinder injector 110 is used in the predetermined high engine speed region, and only in-cylinder injector 110 is used in the predetermined high engine load region. This is allowed because, in the high speed region or high load region, even when only in-cylinder injector 110 injects the fuel, it can produce the homogenous air-fuel mixture because the engine speed and load of engine 10 are high and thus the intake air volume is large. In the above manner, the fuel injected from in-cylinder injector 110 obtains latent heat of vaporization in the combustion chamber (i.e., takes in the heat from the combustion chamber), and thereby vaporizes. This lowers the temperature of the air-fuel mixture at the compression end so that antiknock performance is improved. Since the temperature of the combustion chamber decreases, the intake efficiency is improved to attain high power.

According to the warm state map of FIG. 6, only in-cylinder injector 110 is used when the load factor is equal to or lower than KL(1). This represents that only in-cylinder injector 110 is used in a predetermined low load region when the temperature of engine 10 is high. In the warm state, engine 10 is warm so that deposits are liable to occur in the injection hole of in-cylinder injector 110. However, the fuel injected by in-cylinder injector 110 can lower the injection hole temperature so that the occurrence of deposits can be avoided. Also, the minimum fuel injection amount of the in-cylinder injector can be ensured to prevent clogging of in-cylinder injector 110. For achieving these effects, in-cylinder injector 110 is used in the low load region as described above.

From the comparison between FIGS. 6 and 7, the region of "DI RATIO r=0%" is present in only the cold state map of FIG. 7. This represents that only intake manifold injector 120 is used in a predetermined low load region (equal to or lower than KL(3)) when the temperature of engine 10 is low. Since engine 10 is cold, the load of engine 10 is low and the intake air flow rate is small so that the vaporization of fuel is relatively suppressed. In this region, the fuel injection of in-cylinder injector 110 is difficult to achieve good combustion, and a high output by in-cylinder injector 110 is not required particularly in the region of a low load and a low engine speed. For these reasons, in-cylinder injector 110 is not used, and only intake manifold injector 120 is used.

In the operation other than the normal operation, i.e., in the abnormal state such as a catalyst warm-up state during idling, in-cylinder injector 110 is controlled to perform the stratified charge combustion. By performing the stratified charge combustion only during the catalyst warm-up state, the catalyst warm-up is promoted to improve emissions.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A control device of an internal combustion engine including a first fuel injection mechanism for injecting fuel into a cylinder, and a second fuel injection mechanism for injecting the fuel into an intake manifold, comprising:
    a control unit controlling the fuel injection mechanisms to share the fuel injection between said first and second fuel injection mechanisms based on required conditions of said internal combustion engine; and
    a dilution degree estimating unit estimating a degree of dilution of a lubricating oil used for lubricating said internal combustion engine with the fuel, wherein
    said control unit controls the fuel injection mechanisms to suppress said degree and to achieve a required performance of the internal combustion engine when said estimated degree is large.

2. The control device of the internal combustion engine according to claim 1, wherein
    said control unit controls said first fuel injection mechanism to lower a pressure of the fuel supplied to said first fuel injection mechanism for lowering a spray penetrating force.

3. The control device of the internal combustion engine according to claim 1, wherein
    said control unit controls said first fuel injection mechanism by changing at least one of a fuel injection time and a fuel injection period to prevent impinging of the fuel injected from said first fuel injection mechanism on an inner peripheral surface of the cylinder.

4. The control device of the internal combustion engine according to claim 1, wherein
said control unit controls said second fuel injection mechanism for compensating for a shortage when the shortage occurs with respect to a required fuel injection amount due to change in fuel injection control of said first fuel injection mechanism.

5. The control device of the internal combustion engine according to claim 1, wherein
said first fuel injection mechanism is an in-cylinder injector, and
said second fuel injection mechanism is an intake manifold injector.

6. A control device of an internal combustion engine including first fuel injection means for injecting fuel into a cylinder, and second fuel injection means for injecting the fuel into an intake manifold, comprising:
control means controlling the fuel injection means to share the fuel injection between said first and second fuel injection means based on required conditions of said internal combustion engine; and
dilution degree estimating means estimating a degree of dilution of a lubricating oil used for lubricating said internal combustion engine with the fuel, wherein
said control means includes means for controlling the fuel injection means to suppress said degree and to achieve a required performance of the internal combustion engine when said estimated degree is large.

7. The control device of the internal combustion engine according to claim 6, wherein
said control means includes means for controlling said first fuel injection means to lower a pressure of the fuel supplied to said first fuel injection means for lowering a spray penetrating force.

8. The control device of the internal combustion engine according to claim 6, wherein
said control means includes means for controlling said first fuel injection means by changing at least one of a fuel injection time and a fuel injection period to prevent impinging of the fuel injected from said first fuel injection means on an inner peripheral surface of the cylinder.

9. The control device of the internal combustion engine according to claim 6, wherein
said control means includes means for controlling said second fuel injection means for compensating for a shortage when the shortage occurs with respect to a required fuel injection amount due to change in fuel injection control of said first fuel injection means.

10. The control device of the internal combustion engine according to claim 6, wherein
said first fuel injection means is an in-cylinder injector, and
said second fuel injection means is an intake manifold injector.

* * * * *